Oct. 23, 1962 L. C. RABBITTS 3,059,778
DECKLE STRAP FOR DECKER FILTER
Filed June 2, 1958 2 Sheets-Sheet 1
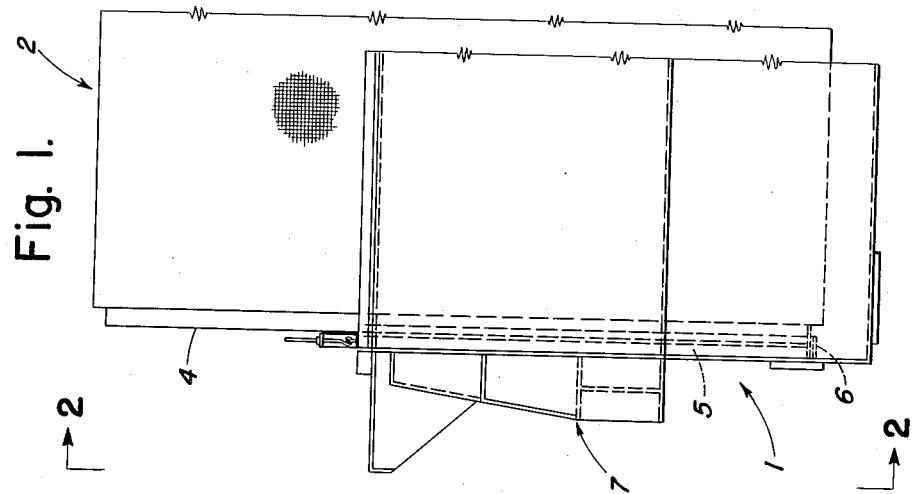
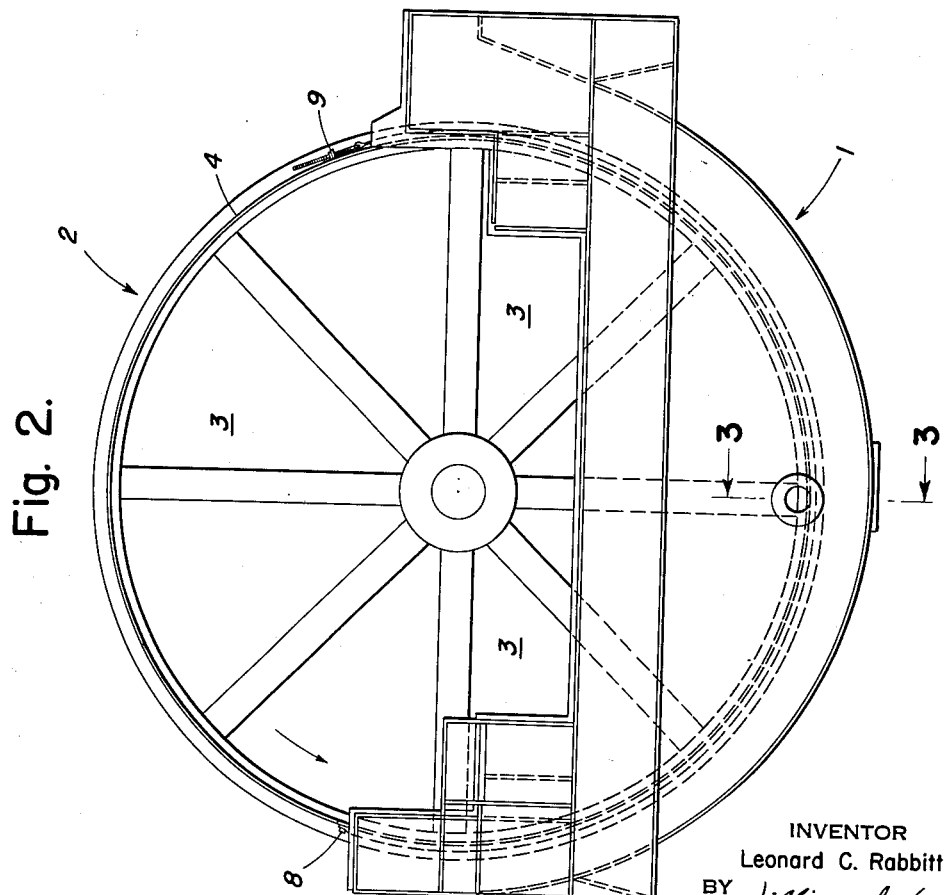
INVENTOR
Leonard C. Rabbitts
BY *William S Henry*
ATTORNEY Oct. 23, 1962 L. C. RABBITTS 3,059,778
DECKLE STRAP FOR DECKER FILTER
Filed June 2, 1958 2 Sheets-Sheet 2
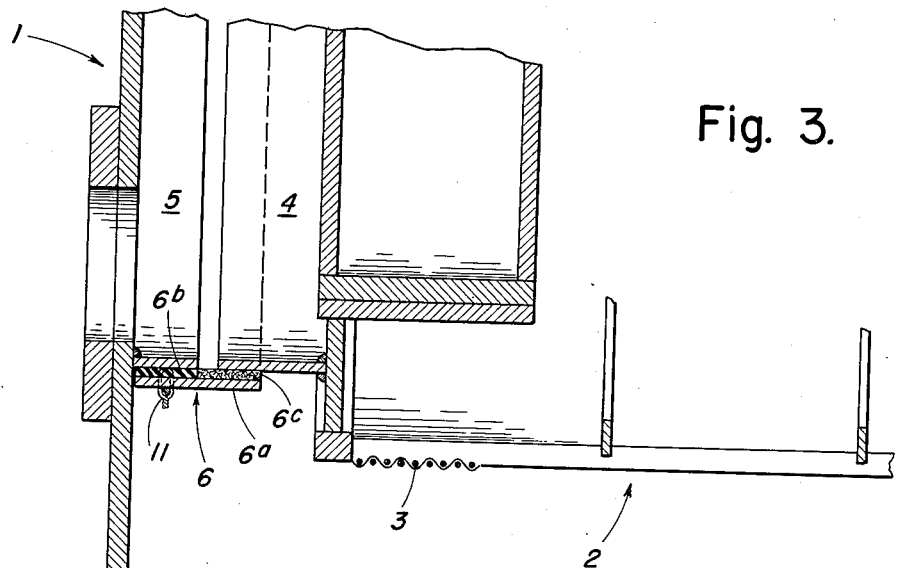
Fig. 3.
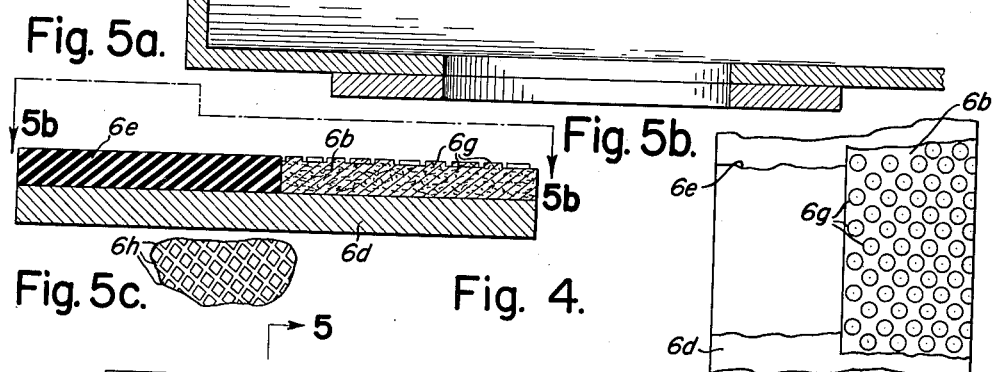
Fig. 5a. Fig. 5b.
Fig. 5c. Fig. 4.
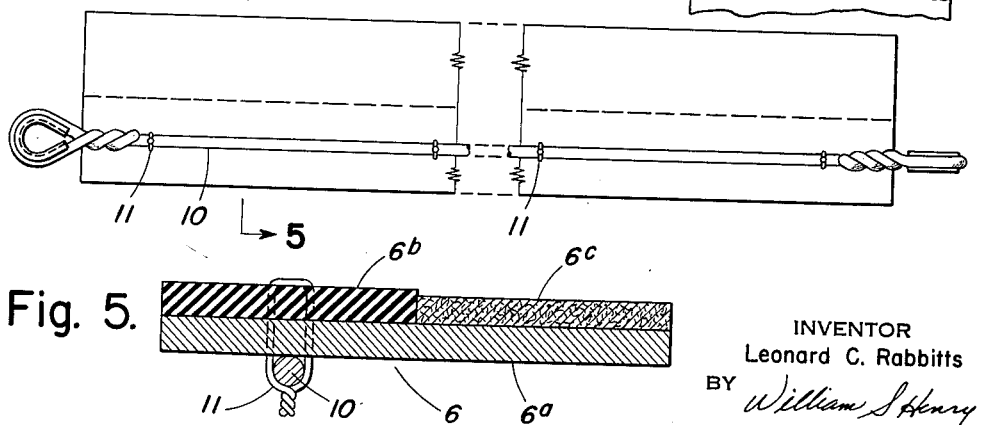
Fig. 5.
INVENTOR
Leonard C. Rabbitts
BY William S Henry
ATTORNEY

United States Patent Office 3,059,778
Patented Oct. 23, 1962

3,059,778
DECKLE STRAP FOR DECKER FILTER
Leonard C. Rabbitts, Orillia, Ontario, Canada, assignor to Dorr-Oliver Incorporated, Stamford, Conn., a corporation of Delaware
Filed June 2, 1958, Ser. No. 739,294
3 Claims. (Cl. 210—297)

This invention relates to rotary drum filters of the so-called "Decker" type and particularly to an improved deckle strap for the same.

Decker filters are well-known in the paper industry as "sheet formers," for de-watering paper pulp slurries in general, and also in straining fruit juices and the like. A Decker filter, as described herein, is characterized by a cylinder or drum covered with a wire or other suitable filter medium rotating in a vat which normally contains enough slurry or stock to submerge 75 to 85% of the cylinder; the filtering operation of a Decker depends on this high degree of submergence which creates a hydrostatic pressure differential between the interior of the drum and the slurry head exterior of the drum; since the cylinder of a Decker is open at one or both ends, it must be provided with a seal between its open ends and the vat head(s) to prevent the slurry entering the cylinder through the open ends; this seal is commonly referred to as a deckle strap or a deckle. Ordinarily an adjustable weir is provided in one or both vat heads to control the elevation of the filtrate within the drum whereby the hydrostatic pressure differential can be controlled or varied.

Deckle straps heretofore employed on filters of this type have generally been made of a thick canvass strap, one surface of which is coated with a hard gray felt facing. The facing overlies a cylindrical projection or ring longitudinally extending from one or both ends of the filter drum and a complementary longitudinally extending semicircular projection fixed to one or both ends of the vat adjacent the open end(s) of the rotary drum. Both ends of the deckle strap are secured to the vat and strap is drawn into intimate forceful contact with both the stationary vat projection and the adjacent complementary rotating drum ring. With this arrangement an intense brakeband effect is created on the downward side of the deckle in the portion contacting the rotating drum ring so that the rising side of the deckle strap becomes warped and slack. This results in a considerable leaking of unfiltered slurry into the interior of the drum thus contaminating the filtrate.

As stated above, in designs heretofore employed, the deckle straps are pulled down equally on the rotating drum ring and the stationary vat projection thus creating a considerable frictional drag on the drum. Since the Decker filter drums are generally in the order of 16 ft. in diameter and strap supporting projections on the drum and vat are substantially the same diameter as the drum, say in the order of 15 ft. in diameter, the strap is overlying a large area which results in a considerable loss in power consumed in overcoming this drag. Further, the hydrostatic head in the vat exerts hydraulic pressure against the strap thus further contributing to the drag effect and power consumption loss.

The improved deckle strap of this invention overcomes the aforementioned disadvantages of drag and leakage by avoiding forceful contact between the rotating drum ring and the deckle strap. It also overcomes the drag that is due to the slurry head acting on the deckle strap to force it against the rotating drum ring. To accomplish this, I provide a deckle having a stainless steel or other suitable longitudinally flexible, laterally rigid, metal backing strap. A compressible high friction shim is riveted or otherwise attached along one edge of one side of this backing. A low friction facing strip of hard felt or other suitable material such as Teflon or nylon is riveted or otherwise attached to the deckle backing strap adjacent the compressible shim and extends substantially to the other edge of the backing. By making the compressible shim of a greater thickness than the facing strip the deckle strap can be fixed to the stationary vat projection only. This is accomplished by drawing only that portion of the deckle, having the underlying shim, into contact with the vat projection which compresses the shim while the facing of the deckle strap is brought into sealing but low frictional contact with the rotary drum ring. Since the backing is transversely or laterally rigid and the complementary projections on the drum and vat are axially and radially aligned, this sealing engagement is maintained uniform throughout the area of contact. In this way the drag or brakeband effect between the deckle strap and rotating drum is minimized and a suitable seal is effected over the periphery of the deckle strap in contact with the rotating drum ring.

The primary object, therefore, of this invention is to provide a Decker-type filter with a deckle which creates a minimum of drag resulting in a significant reduction in the power consumption of such a filter.

In order that this invention may be understood and practiced, the following description of the accompanying drawings is given by way of example:

FIG. 1 is a side elevation of the discharge end of a Decker filter showing the location of the deckle strap;

FIG. 2 is an end view taken on line 2—2 of FIG. 1 showing the open end of the drum and a manner of mounting the deckle strap on a Decker filter;

FIG. 3 is a detailed sectional view of a Decker filter incorporating this invention taken along lines 3—3 of FIG. 2;

FIG. 4 is a top view of the deckle strap of this invention illustrating a manner of drawing down only that portion of the deckle strap in contact with the fixed vat ring;

FIG. 5 is a detailed cross-sectional view of a deckle strap constructed in accordance with this invention.

FIG. 5a is a cross-section of the deckle strap similar to FIG. 5 illustrating a special feature in the formation of the sealing surface thereof;

FIG. 5b is a face view of the deckle strap taken on line 5b—5b of FIG. 5a;

FIG. 5c illustrates a modification of the surface feature.

Referring to FIG. 1, numeral 1 generally illustrates the vat or tank of a Decker-type filter upon which a drum 2 is mounted for rotation within the vat. On the drum periphery is mounted a suitable filter medium upon which slurry solids are deposited as the liquid passes therethrough. The filtrate is discharged from an open end 3 of the drum and subsequently discharged from the filter over an adjustable weir 7. The drum is provided with a projecting circular flange or ring 4 and the vat head is provided with a radially complementary semicircular projection 5, co-axial with the ring 4. A deckle strap 6 overlies each of the elements 4 and 5 but is secured only to the projection 5 on the vat. The portion of the deckle overlying the rotating ring 4 is in sealing engagement therewith while simultaneously creating a minimum of drag as hereinafter more fully explained.

In FIG. 2, the direction of rotation of the drum is shown by arrows. One end of the deckle strap is rigidly fixed to the vat in any suitable manner, as at 8, at a location adjacent the downwardly moving portion of the drum. The other end of the deckle strap is adjustably fixed to the vat in a suitable manner as shown at 9, to enable proper tensioning of the strap.

FIG. 3 is a detailed view illustrating cooperation between the rotary drum ring 4, the fixed vat semi-circular projection 5 and the deckle strap 6.

As best shown in FIGS. 3 and 5, the deckle comprises a metal strap 6a, a compressible non-slipping shim 6b such as rubberized belting, cork gasket material and the like. Shim 6b is secured by riveting or other suitable means to the strap 6a adjacent one edge portion of the strap to overlie vat projection 5. The other edge portion of the strap 6a has a facing member or strip 6c of hard gray felt or other suitable material such as Teflon or nylon fixed thereto in any suitable manner as by recessed rivets or an epoxy resin adhesive such as "Resiweld" manufactured by H. B. Fuller Co. and overlying the rotating drum ring 4. As shown in FIG. 5, the compressible shim 6b is of greater thickness than the facing member 6c so that when the deckle is secured on the vat projection 5 the facing member 6c can be brought into relatively frictionless contact with the rotating element 4 attached to the drum 2. In a particular arrangement, useful under certain conditions (as when filtering fibrous solids), the felt, or other such fibrous material, may be deliberately mounted so as to be held away from the drum ring a distance approximately equal the diameter of fibers in the slurry to allow such fibers to complete the seal between the ring and the felt. It is also contemplated to use on the facing member materials which act as a filter media. For instance Teflon or nylon strips may be used in place of the felt. The Teflon or nylon may be formed with a surface of closely spaced pin-like projections forming minute, tortuous paths whereby the member acts as a filter media on which slurry solids are deposited to thereby prevent solids passing into the filtrate discharge 7 but allowing liquid to lubricate the interface between ring 4 and the deckle. The tortuous path can be formed in the Teflon and nylon surface in any suitable manner such as by cutting a multitude of intersecting channels on the exposed face of the nylon or Teflon member. Alternatively, a strip of Teflon, nylon or other similar material with a smooth continuous surface in contact with the drum ring may be employed to advantage because of the abrasive or wear resistance and low frictional properties of such materials.

Accordingly, an example in FIGS. 5a and 5b shows a deckle strap substantially similar to the one illustrated in FIG. 5, wherein the metal strap 6d and frictional shim member 6e of FIGS. 5a and 5b may be the same as respective parts 6a and 6b in FIG. 5, whereas the facing member 6f differs from the facing member 6c of FIG. 5, by the formation thereon of the aforementioned tortuous paths, provided for example by the pin-like projections 6g or of intersecting channels 6h which are formed on the exposed face of the facing member as exemplified in FIG. 5c.

While the cable 10 shown in FIGS. 3, 4 and 5 is not necessary, if the strap 6a of the deckle is made strong enough, a suitably simple arrangement is to use a thin flexible strap 6a to which the cable 10 is fixed at one-foot intervals with a twisted wire 11, rivets, or other like means.

I claim:
1. A deckle strap for engaging both the open cylindrical end of a rotary filter drum and the associated stationary coaxial ring on the filter vat, comprising a longitudinal flexible transversely rigid elongated backing member, a friction shim consisting of one kind of material fixed to said backing member along one longitudinal edge thereof and adapted to be held in intimate contact with said ring, and a facing member consisting of another material fixed to said backing member along the longitudinal edge thereof and adapted to engage said cylindrical end of the filter drum in low-friction sealing relationship therewith, wherein said facing member is formed with a surface of closely spaced pin-like projections forming minute tortuous paths whereby said facing member's material is adapted to act as a filter medium for preventing feed solids from entering the filtrate while allowing liquid to pass therethrough.

2. A deckle strap for engaging both the open cylindrical end of a rotary filter drum and the associated stationary coaxial ring on the filter vat, comprising a longitudinal flexible transversely rigid elongated backing member, a friction shim consisting of one kind of material fixed to said backing member along one longitudinal edge thereof and adapted to be held in intimate contact with said ring, and a facing member consisting of another material fixed to said backing member along the longitudinal edge thereof and adapted to engage said cylindrical end of the filter drum in low-friction sealing relationship therewith, wherein said facing member is formed with a surface of projections as defined by intersecting channels formed in said surface to provide a system of tortuous paths whereby said facing member's material is adapted to act as a filter medium for preventing feed solids from entering the filtrate while allowing liquid to pass therethrough.

3. A deckle strap for engaging both the open cylindrical end of a rotary filter drum and the associated stationary coaxial ring on the filter vat, comprising a longitudinal flexible transversely rigid elongated backing member, a friction shim consisting of one kind of material fixed to said backing member along one longitudinal edge thereof and adapted to be held in intimate contact with said ring, and a facing member consisting of another material fixed to said backing member along the longitudinal edge thereof and adapted to engage said cylindrical end of the filter drum in low-friction sealing relationship therewith, wherein said facing member is formed with a surface of closely spaced projections forming between them tortuous paths whereby said facing member's material is adapted to act as a filter medium for preventing feed solids from entering the filtrate while allowing liquid to pass therethrough.

References Cited in the file of this patent

UNITED STATES PATENTS

| | | |
|---|---|---|
| 2,092,252 | Hillier | Sept. 7, 1937 |
| 2,302,578 | Serrell | Nov. 17, 1942 |
| 2,639,000 | Edwards | May 19, 1953 |
| 2,751,086 | Borjeson | June 19, 1956 |
| 2,788,125 | Webb | Apr. 9, 1957 |
| 2,893,760 | Jewell | July 7, 1959 |
| 2,903,278 | Wormser | Sept. 8, 1959 |

FOREIGN PATENTS

| | | |
|---|---|---|
| 182,563 | Germany | 1907 |
| 478,484 | Great Britain | Jan. 19, 1938 |